(12) United States Patent
Kennedy (10) Patent No.: US 6,641,400 B1
(45) Date of Patent: Nov. 4, 2003

(54) MULTI-DISCIPLINARY EDUCATIONAL TOOL

(76) Inventor: Lorraine M. Kennedy, 504 Lathrop, Lansing, MI (US) 48912

( * ) Notice: Subject to any disclaimer, the term of this patent is extended or adjusted under 35 U.S.C. 154(b) by 0 days.

(21) Appl. No.: 10/064,737

(22) Filed: Aug. 12, 2002

(51) Int. Cl.[7] ................... G09B 19/22; G09B 19/18; A63F 3/00
(52) U.S. Cl. ................... 434/128; 434/107; 434/129; 434/130; 434/154; 273/256
(58) Field of Search ................... 434/107, 128–129, 434/130, 154, 323; 273/251, 252, 254, 256

(56) References Cited

U.S. PATENT DOCUMENTS

| | | |
|---|---|---|
| 1,504,446 A | 8/1924 | Hall |
| 2,399,811 A | 5/1946 | Krassilnikoff |
| 3,955,289 A | 5/1976 | Gillis |
| 4,266,775 A * | 5/1981 | Chitnis et al. ............... 273/278 |
| 4,445,692 A * | 5/1984 | Boyle ......................... 273/256 |
| 4,538,816 A | 9/1985 | Figueroa |
| 4,850,597 A * | 7/1989 | Milliken ..................... 273/254 |
| 4,932,666 A | 6/1990 | Corle |
| 5,013,048 A | 5/1991 | Turner |
| 5,114,344 A | 5/1992 | Fumagalli et al. |
| 5,123,846 A | 6/1992 | Lewis |
| 5,295,834 A | 3/1994 | Saunders |
| 5,580,252 A | 12/1996 | McCrady |
| 5,839,902 A | 11/1998 | Wood |
| 5,876,211 A | 3/1999 | Schmoyer et al. |
| 6,045,128 A | 4/2000 | Hunt |
| 6,120,296 A | 9/2000 | Lim |
| 6,164,971 A | 12/2000 | Figart |
| 6,189,886 B1 | 2/2001 | Moran |
| 6,247,698 B1 * | 6/2001 | Twombly ..................... 273/297 |
| 6,273,725 B1 | 8/2001 | Bernstein et al. |
| 6,290,230 B1 | 9/2001 | Anthony |
| 2003/0038805 A1 * | 2/2003 | Wong et al. ................. 345/473 |

FOREIGN PATENT DOCUMENTS

GB 2205762 A * 12/1988 ............. A63F/9/18

* cited by examiner

Primary Examiner—John Edmund Rovnak
(74) Attorney, Agent, or Firm—John M. Naber; Nancy A. Vashaw (57) ABSTRACT

A multi-disciplinary educational tool having a plurality of commodity representations, a plurality of instruction cards, and at least one cargo transfer means that is moved among a plurality of geographical regions is disclosed. The multi-disciplinary educational tool can also comprise a playing surface to represent a plurality of geographical regions. The commodity representations comprise physical samples, pictorial representations or a combination of physical samples and pictorial representations of the represented commodities. The multi-disciplinary educational tool can also comprise a quantity of money for use during trading and exchange rates, wherein the exchange rates can set prices and exchange rates for the plurality of commodity representations. The multi-disciplinary educational tool can also comprise a plurality of impact cards that affect trading.

18 Claims, 7 Drawing Sheets

MULTI-DISCIPLINARY EDUCATIONAL TOOL

FIELD OF THE INVENTION

The present invention relates generally to a multi-disciplinary educational tool and specifically to methods and computer systems to simulate commodities trading, business models, history, and social studies.

BACKGROUND OF THE INVENTION

Effective learning games often involve the student's use of multiple senses such as seeing, hearing, touching and speaking. Such interactive teaching methods are more effective than mere memorization. Interactive teaching methods are known in the art. Some provide players (or students) with rewards for answering questions correctly while others involve elements of chance. Many such prior art interactive teaching methods focus on sensory perceptions. For example, U.S. Pat. No. 6,290,230 to Anthony involves a theme of touch while improving finger dexterity and mental imaging. To play the game, the player spins a card housing. When the card housing stops, a card is displayed in a view window. The card contains an object and a description of the object. After reading the card or touching the object on the card, the player searches for the corresponding object under a domed container in order to obtain points. The player also learns educational information about the game pieces.

U.S. Pat. No. 5,839,902 to Wood describes an electronic teaching device that provides information on various geography topics upon insertion of a card with encoded information. After the card is inserted, the device may produce a statement or sound associated with the object depicted. See also U.S. Pat. No. 5,123,846 to Lewis, U.S. Pat. No. 5,580,252 to McCrady, U.S. Pat. No. 6,045,128 to Hunt, U.S. Pat. No. 4,932,666 to Corle, and U.S. Pat. No. 5,013,048 to Turner.

Other types of games or teaching devices are designed to provide instruction about specific concepts and real life circumstances. U.S. Pat. No. 6,189,886 to Moran describes the stock market. U.S. Pat. No. 4,538,816 to Figueroa describes a game involving commodities trading.

Other subjects are also taught in the art in an interactive manner. U.S. Pat. No. 5,114,344 to Fumagalli, et al. describes a game about the environment. U.S. Pat. No. 5,876,211 to Schmoyer, et al. describes a board game designed to simulate a school system. U.S. Pat. No. 5,295,834 to Saunders describes a game to teach religious subject matter.

Most of the prior art is limited to single specific areas of education. There are no known attempts to combine several educational experiences within a single activity using player interaction and using all the senses including sight, smell, sound, and touch. An interactive tool could be engaging, while also teaching, for example, commodities, trading, business, history and social studies.

SUMMARY OF THE INVENTION

Accordingly, the present invention provides an interactive, multi-disciplinary educational tool including methods and computer systems to simulate commodities trading, business models, history, and social studies.

Specifically the invention is a multi-disciplinary educational tool that can have a plurality of commodity representations, a plurality of instruction cards, a plurality of impact cards, and at least one cargo transfer means that can be moved among a plurality of geographical regions. The multi-disciplinary educational tool can also have a playing surface representing a plurality of geographical regions. The commodity representations can represent physical samples, pictorial representations, a combination of physical samples and pictorial representations, or computer simulations of the represented commodities and the like.

The multi-disciplinary educational tool can also use a quantity of money for use during trading, wherein the quantity of money can set prices and exchange rates to the plurality of commodity representations. The multi-disciplinary educational tool can also have a plurality of impact cards that affect trading.

Other features and advantages of the present invention will become more apparent to persons having ordinary skill in the art to which the present invention pertains from the following description taken in conjunction with the accompanying figures.

BRIEF DESCRIPTION OF THE DRAWINGS

The foregoing advantages and features, as well as other advantages and features, will become apparent with reference to the description and figures below, in which like numerals represent like elements and in which.

DETAILED DESCRIPTION

The present invention generally involves a multi-disciplinary educational tool also suitable for entertainment. One embodiment of the present invention can teach history, social studies, geography, commodities, trading, and business using sight, smell and touch. In this embodiment, using a variety of sensory experiences, the Atlantic trade of the $18^{th}$ and $19^{th}$ centuries can be taught. An alternate embodiment of the invention can also use computer systems to teach multi-disciplinary educational materials.

The present invention can use a plurality of geographical regions. For illustrative purposes one embodiment of a potential playing surface 11 4, shown in FIG. 1, can include America's Southern Colonies 100, America's Northern Colonies 102, England 104, Africa 106 and West Indies 108. It is noted that the invention can use any combination of these geographical regions.

Figure 1:
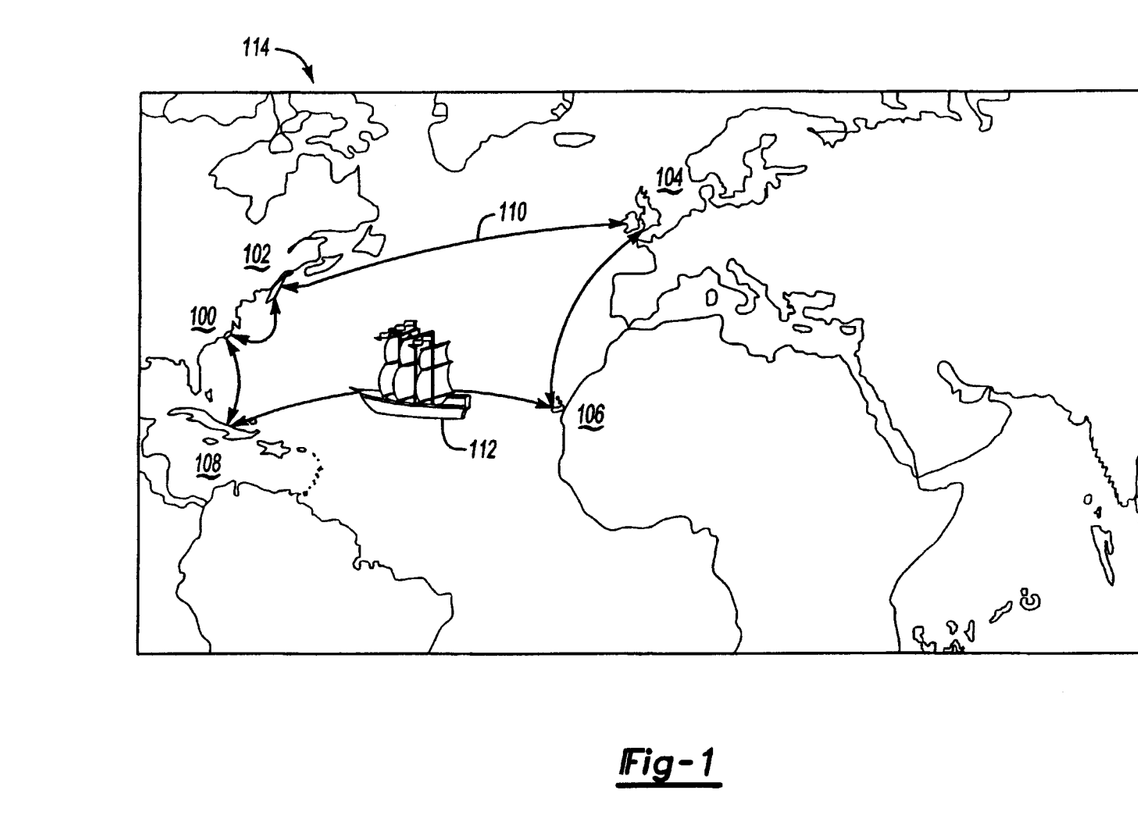
FIG. 1 illustrates a potential playing surface of one embodiment of the present invention.
Figure 2:
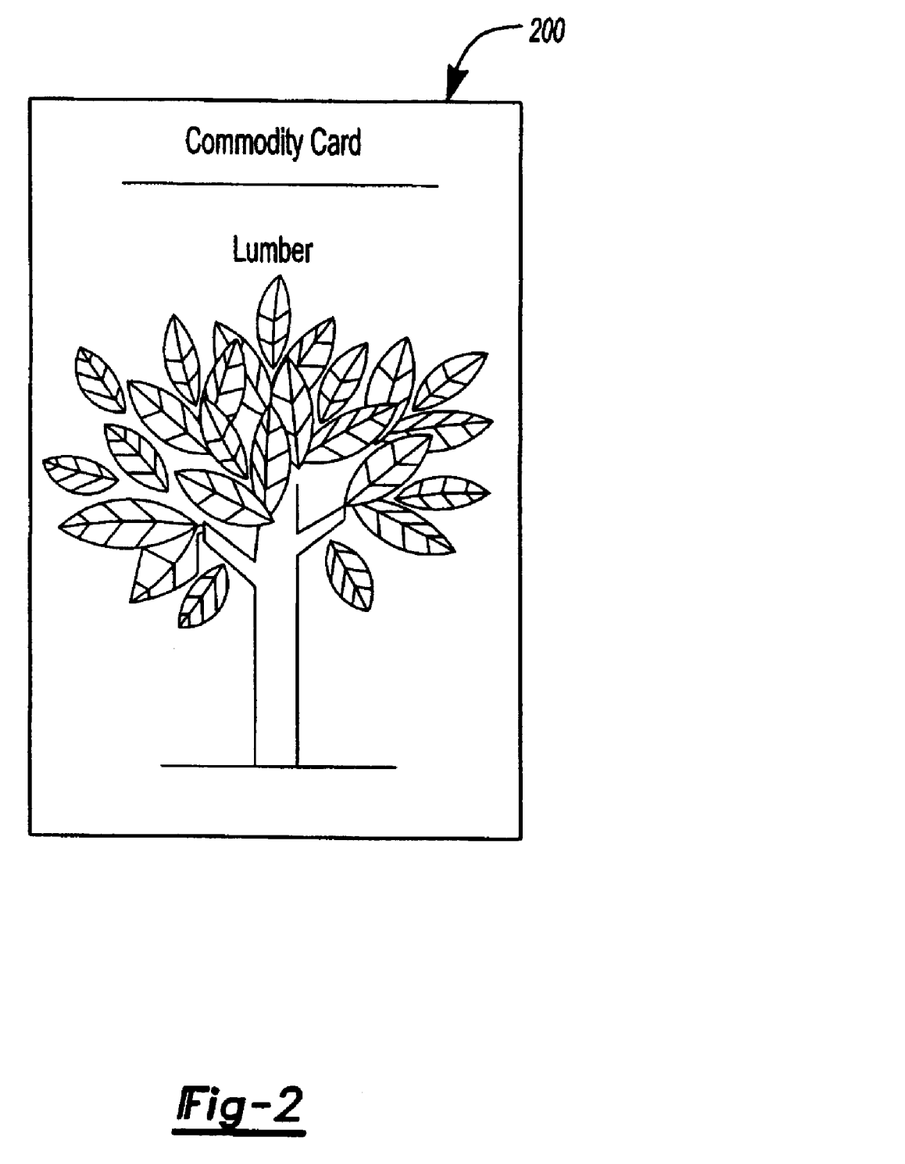
FIG. 2 illustrates a commodity card of one embodiment of the present invention.

Each region produces various commodities. The invention can include a representative sample of these commodities. The invention is not limited by the number or type of each of these commodities. They can be represented in this invention in either a physical representative form, such as a tea bag for tea production, a cotton ball for cotton production, and the like. Alternatively, the commodity can be represented in a pictorial form such as on a commodity card, a sample of which is shown at 200 in FIG. 2. For this embodiment, the preference would be to use an example of a commodity in some physical form whenever practical so that players can see, touch, and smell the represented commodities. All the commodities are placed on or near the playing surface 114 as illustrated in FIG. 1.

Desired or needed commodities that cannot be produced domestically in the represented geographical regions need to be imported from the other regions. For example, the Southern Colonies 100 can export cotton, rice, tobacco and indigo. The Northern Colonies 102 can export grain, lumber, rum, iron, fur, fish and tools. England 104 can export manufactured goods, tools, guns and other weapons, luxury items, tea, spices from Europe and Asia, and trinkets (such as brass rings, bells, mirrors and buttons). Africa's 106 exports can include slaves, ivory and beads. The West Indies' 108 exports can include sugar and molasses. The present invention can be practiced with other commodities and with any combination of geographical regions.

During play of the present invention, individuals or groups of individuals can be assigned to maintain the flow of commodities within a particular geographical region. Each individual or group of individuals is next given an instruction card, an example of which is generally indicated at 300 in FIG. 3. This particular instruction card 300 details commodities available within the particular geographical region 302, items the region can export 304, and items the region needs to import 306. The number and type of commodity is variable and can change based on the age or sophistication of the target player. The players sort the commodities and place them at or near their respective geographic area on the playing surface 114 as illustrated in FIG. 1.

Figure 3:
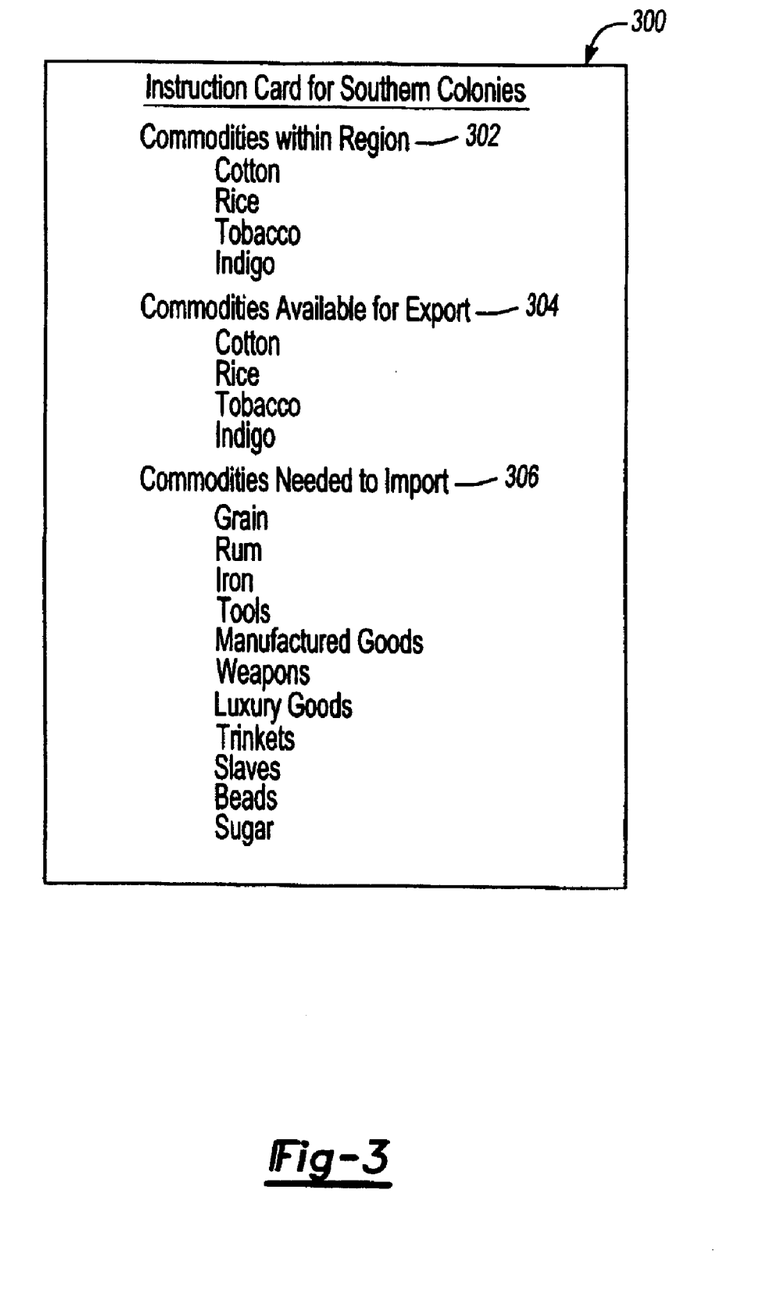
FIG. 3 illustrates an instruction card of one embodiment of the present invention.

After the commodities have been distributed, the players can simulate the establishment of trade among the other geographical areas consistent with their respective instruction card 300. In one embodiment, the commodities can be transferred among the geographical regions using a cargo transfer means along a trade route 110 that follows prevailing trade winds. In this embodiment, the cargo transfer means can represent a model of a ship 112 large enough to hold the commodities traded.

For illustrative purposes, the cargo transfer means, the ship 12, can start in the Northern Colonies 102. The players representing the Northern Colonies 102 can place on or in the ship 112 the items they wish to export or have available to export. The ship 112 can follow the trade route 110 to England 104.

In England 104, the individual or group of individuals representing England 104 can unload the items their region needs or desires to import and load the items their region wishes to export. From England 104, the ship 112 can then travel along the trade route 110 to Africa 106, then to the West Indies 108 and then to the Southern Colonies 100, where the unloading and loading is repeated at each stop.

To complete one trade cycle, the ship 112 can return to the Northern Colonies 102, where the items needed by the Northern Colonies 102 can be unloaded. The cycle can then repeat.

Other embodiments of the present invention can add or remove complexity and elements of chance. Added complexity can include the introduction of additional commodities, additional cargo transfer means, additional geographic regions or additional ports within geographic regions, and additional trade routes. Added complexity can also include the use of monetary or other exchange systems that set prices and exchange rates for the commodities.

Figure 4:
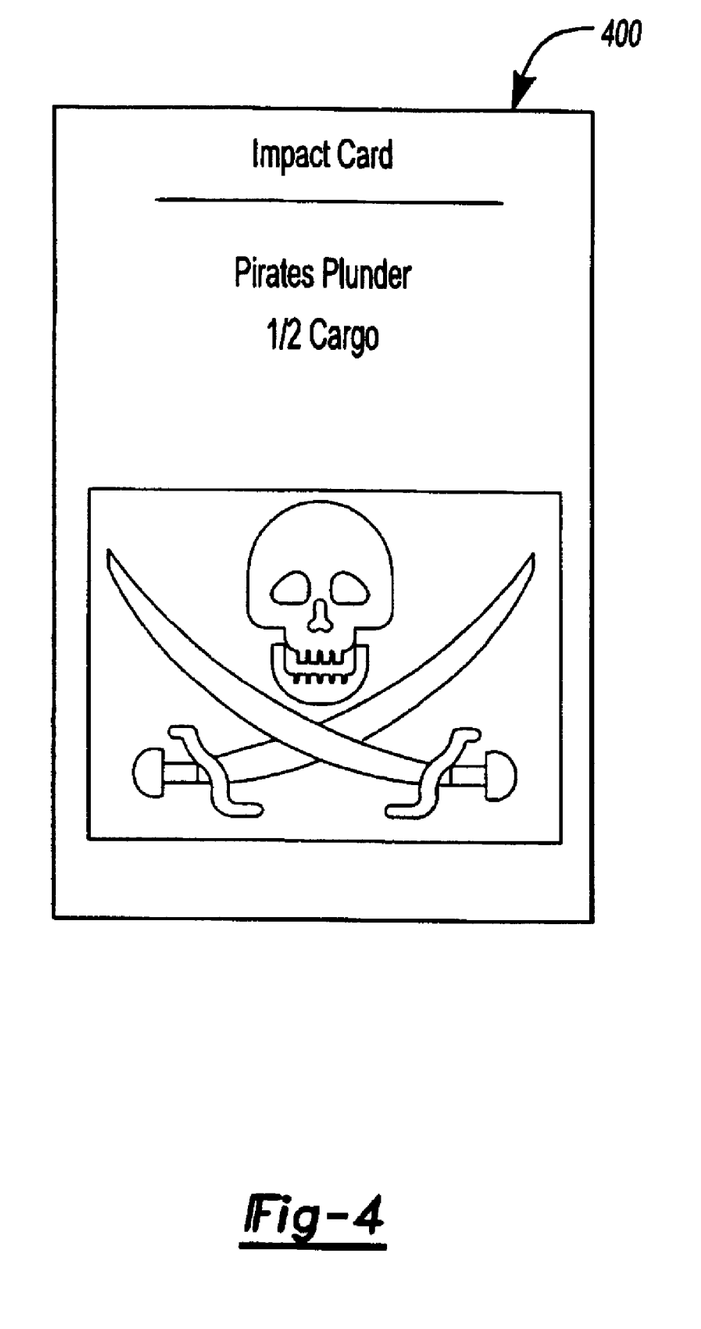
FIG. 4 illustrates an impact card of one embodiment of the present invention.

Elements of chance can be introduced by the use of a plurality of impact cards 400, shown in FIG. 4. These impact cards 400 can represent economic, political, social or natural events that affect trade. Economic events can include changes in value of various commodities; changes in demand or supply of various commodities; taxation; duties; tariffs; profit margins for importers, exporters and cargo transfer means owners; interest rates and interest rate changes for money used to finance the trading; and recession. Political events can include wars, piracy and law changes. Social events can include mutinies, riots and changes in demand for various commodities. Natural events can include good and bad weather, leading to good or bad crops; favorable or unfavorable winds, leading to faster or slower shipping; cargo spoilage; cargo damage; and cargo transfer means damage. Whether described as a political, economic, social or natural event, the elements of chance can impact each of these disciplines and further add to the education of the participants. Several cards could also be added that result in no impact in trade.

The impact cards 400 can be used in a variety of ways. For example, an impact card 400 can be used at the beginning of each trading cycle or every time the ship 112 lands in a geographical region. Alternate uses of the impact cards 400 could include distributing a fixed number of impact cards 400 to each geographic region, where the individual or group of individuals representing that particular geographic region could use an impact card 400 at their turn. A second alternative could include, the impact cards 400 being distributed randomly by a die or dice, an activity moderator, or a teacher.

The multi-disciplinary educational tool can also include a playing board with spaces thereon corresponding to the various geographical regions and trade routes. Players could take turns by rolling a die or dice to advance to different geographical regions or to take an impact card 400 from a stack.

Other variations of the present invention can include modern trade and economic models. For example, a variation of the present invention could represent trade between present day countries and include modern cargo transfer means and commodities practice. Modern cargo transfer means could include rail, truck, and specialty ships, such as an oil tanker. Another variation of the present invention can include tracking the development of various technologies that change trade over time.

In yet another embodiment, which can include the variations described above, the present invention can be configured to run on a computer. In this embodiment, the multi-disciplinary educational tool can be embodied in a computer readable code on a computer readable storage device, wherein the computer readable code is executed using one or more microprocessors, computers, or central processing units having one or more computer readable storage devices, one or more memory management units and one or more input/output devices for communicating with individuals or groups of individuals using the multi-disciplinary tool.

Figure 5:
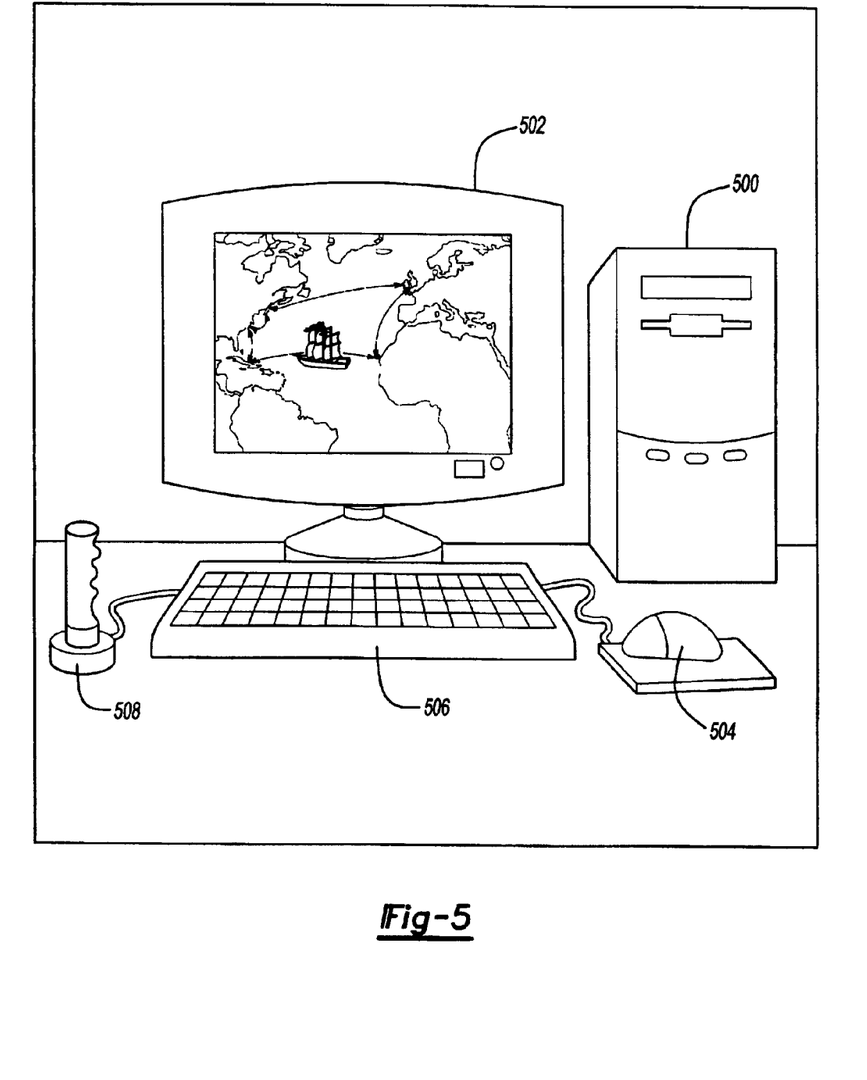
FIG. 5 illustrates shows an embodiment of the present invention being played on a computer.

As shown in FIG. 5, in an alternate embodiment, the present invention multi-disciplinary educational tool may be played on a computer 500 in an interactive fashion.

Figure 7:
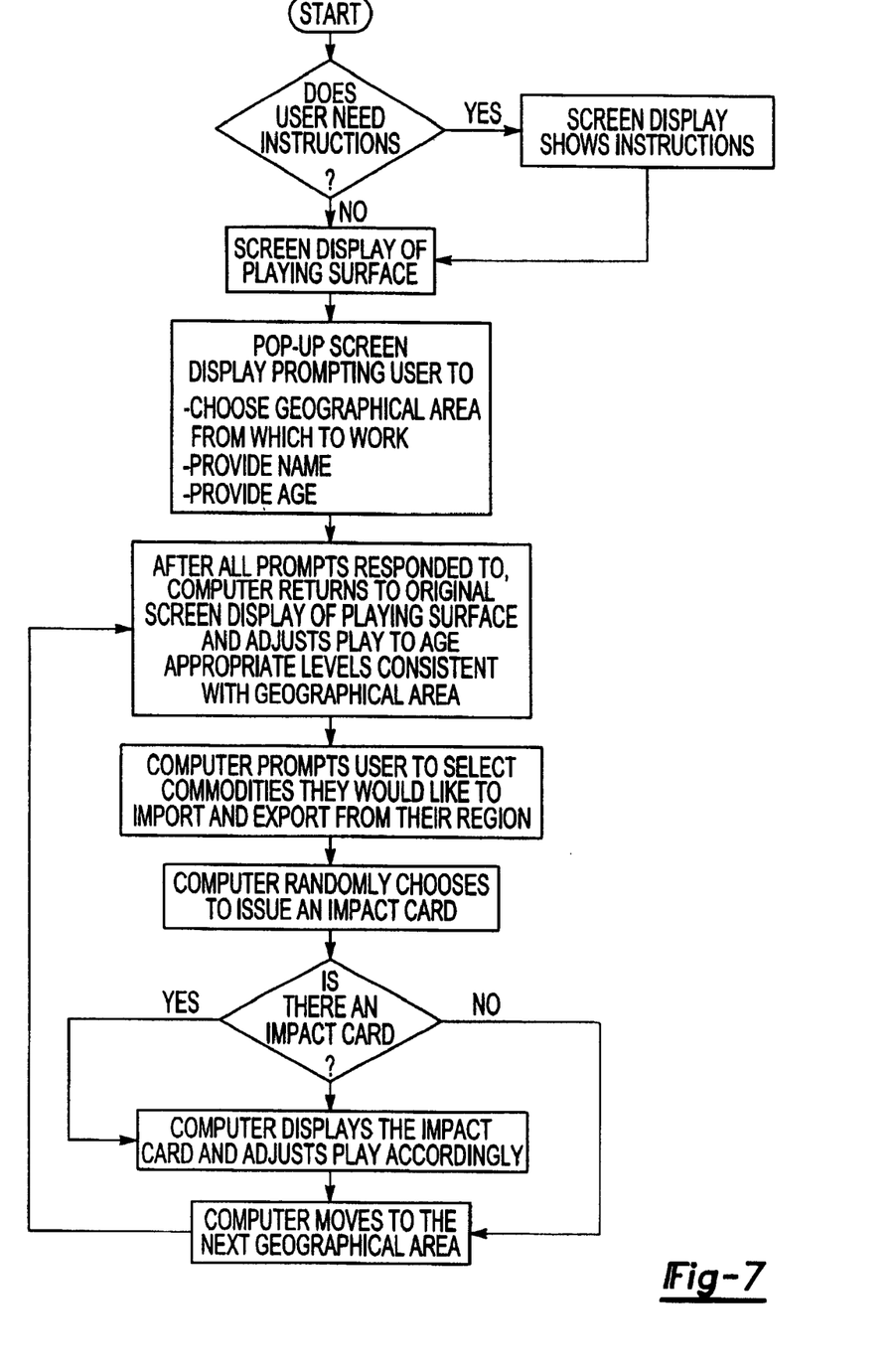
FIG. 7 illustrates a schematic representation of program flow followed as the present invention is played on a computer.

In such an embodiment, the playing surface 114 may be represented on a computer monitor 502. The computer 500 includes input devices, so that players may interact with the computer. Although the preferred input device 504 is a mouse, other devices including, but not limited to, a keyboard 506 or a joystick 508, may also be used, as desired. In the computerized embodiment of the present invention, a die or dice or other type of random event generator may be replaced by a random number generating routine executed by the computer 500. The goals of the alternate computerized embodiment of the present invention are substantially the same as in the embodiment previously described. The computer 500 would follow a flow path depicted in FIG. 7.

In the computerized embodiment of the present invention, the activity is conducted by one player at a time after initial instructions or directions are offered by the computer. At the beginning of this interactive activity, the user will log on with name, age, and a selection of a geographical area to work from. The questions and content of the activity could then be tailored accordingly.

Figure 6:
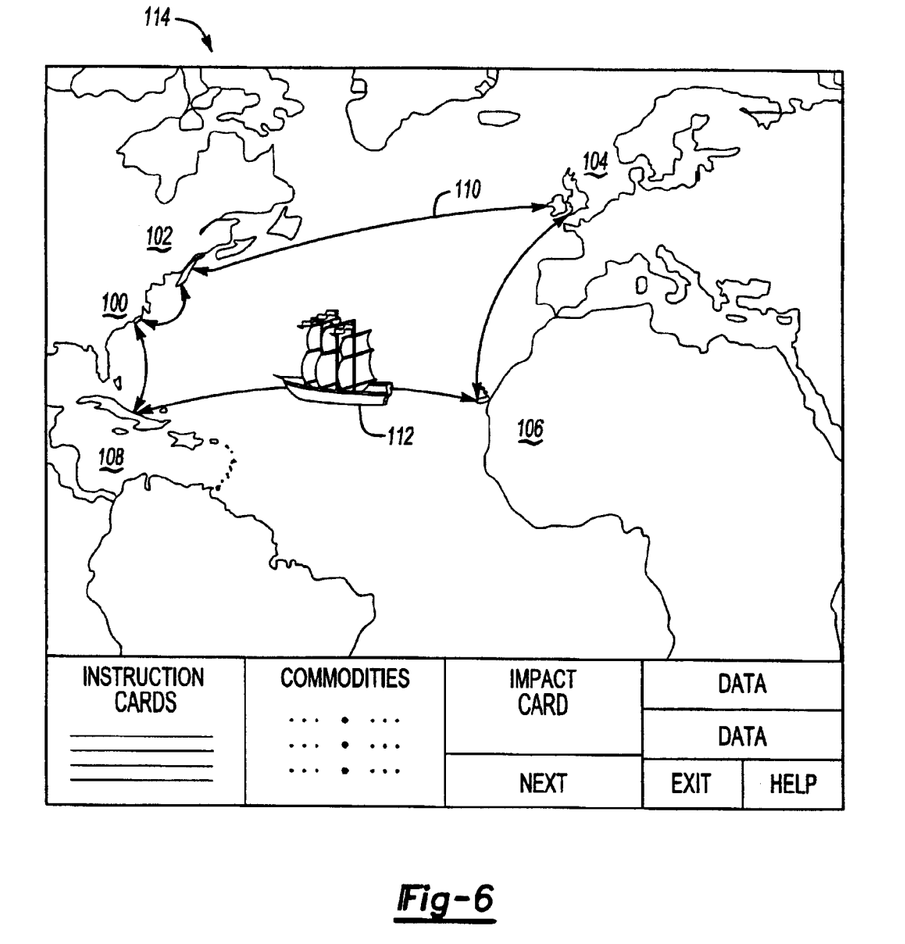
FIG. 6 shows a close-up view of the computer screen shown in FIG. 5.

As seen in FIG. 6, the computer monitor 502 may initially display the playing surface 114. Various verbal prompts, background noises, and graphical images can be generated by the computer 500. The player can click on a geographical region that will generate a pop-up screen showing commodities available in the region. Again the program can generate various sight and sounds to illustrate the commodity.

The computer 500 would then prompt the user to choose the commodities they would like to import and export corresponding to their selected geographical region. The user could then click NEXT to trigger an impact card selected randomly by the computer 500 followed by movement to the next geographical region. The same routine could be followed by additional users for each region, or alternatively selected by the computer 500 so that a single user can participate. Ultimately play can stop by a user command or by failure of a region caused by a user.

The above-described embodiments of the invention are provided purely for purposes of example. Many other variations, and modifications, and applications of the invention may be made.

What is claimed is:

1. A multi-disciplinary educational tool, comprising:
   a plurality of commodity representations to be traded;
   a plurality of instruction cards, each instruction card corresponding to a particular geographical region of a plurality of geographical regions and having indications thereon corresponding to exportable commodities within the particular geographical region, and importable commodities within the particular geographical region;
   at least one cargo transfer means that is moved among the plurality of geographical regions along a trade route determined by prevailing trade winds; and
   at least one user, the user assigned a particular geographic region and wherein the object of the tool is to simulate the trade of commodities between the plurality of geographic regions and for the user to maintain the flow of commodities within the particular geographical region.

2. The multi-disciplinary educational tool of claim 1, wherein the cargo transfer means represents a ship.

3. The multi-disciplinary educational of claim 1, further comprising a playing surface to represent the plurality of geographical regions.

4. The multi-disciplinary educational tool of claim 1, wherein the plurality of commodity representations comprise physical samples of the represented commodities.

5. The multi-disciplinary educational tool of claim 1, wherein the plurality of commodity representations comprise pictorial representations of the represented commodities.

6. The multi-disciplinary educational tool of claim 5, wherein the pictorial representations of the plurality of represented commodities are on a commodity card.

7. The multi-disciplinary educational tool of claim 1, wherein the plurality of commodity representations comprise a combination of physical samples and pictorial representations of the plurality of represented commodities.

8. The multi-disciplinary educational tool of claim 7, wherein the pictorial representations of the plurality of represented commodities are on a commodity card.

9. The multi-disciplinary educational tool of claim 1, further comprising a quantity of money for use during trading.

10. The multi-disciplinary educational tool of claim 1, further comprising a plurality of impact cards, representing a plurality of events that affect trading.

11. The multi-disciplinary educational tool of claim 10, wherein the plurality of events is selected from the group consisting of changes in value of the plurality of commodity representations, changes in demand of the plurality of commodity representations, changes in supply of the plurality of commodity representations, taxation, duties, tariffs, profit margins for importers, profit margins for exporters, profit margins for cargo transfer means owners, interest rates on money used to finance trading, interest rate changes on money used to finance trading, recessions, wars, piracy, law changes, mutinies, riots, changes in demand for various commodities, good weather, bad weather, favorable trade winds, unfavorable trade winds, cargo spoilage, cargo damage, and cargo transfer means damage.

12. The multi-disciplinary educational tool of claim 1, wherein the plurality of geographical regions represent Northern Colonies, Southern Colonies, England, Africa and West Indies of the Atlantic trade of the $18^{th}$ and $19^{th}$ centuries.

13. The multi-disciplinary educational tool of claim 12, wherein the Northern Colonies can export commodity representations selected from the group consisting of grain, lumber, rum, iron, fur, fish and tools;
   the Southern Colonies can export commodity representations selected from the group consisting of cotton, rice, tobacco and indigo;
   England can export commodity representations selected from the group consisting of manufactured goods, tools, guns and other weapons, luxury items, tea, spices, and trinkets; and
   Africa can export commodity representations selected from the group consisting of slaves, ivory and beads; and
   the West Indies can export commodity representations selected from the group consisting of sugar and molasses.

14. The multi-disciplinary educational tool of claim 12, wherein: the Northern Colonies' export commodity representations comprise grain, lumber, rum, iron, fur, fish and tools;
   the Southern Colonies' export commodity representations comprise cotton, rice, tobacco and indigo;
   England export commodity representations comprise manufactured goods, tools, guns and other weapons, luxury items, tea, spices, and trinkets;
   Africa export commodity representations comprise slaves, ivory and beads; and
   the West Indies export commodity representations comprise sugar and molasses.

15. The multi-disciplinary educational tool of claim 1, wherein the plurality of geographical regions represent present day countries.

16. The multi-disciplinary educational tool of claim 1, wherein the multi-disciplinary educational game is embodied in a computer readable code on a computer readable storage device; and the computer readable code is executed using one or more computers having one or more computer readable storage devices, one or more memory management units and one or more input/output devices for communicating with a user of the multi-disciplinary game.

17. A multi-disciplinary educational tool, comprising:

a plurality of commodity representations to be traded between a plurality of users;

a plurality of instruction cards;

a plurality of geographical regions;

at least one cargo transfer device configured to receive at least one of the plurality of commodity representations; and wherein the commodity representations include physical samples of the commodities being traded.

18. A multi-disciplinary educational tool to be used by plurality of users, comprising:

a plurality of commodity representations to be traded between the plurality of users;

a plurality of instruction cards;

a plurality of geographical regions;

at least one cargo transfer device configured to receive at least one of the plurality of commodity representations; and wherein the object of the tool is to permit the users to simulate trade between the plurality of geographic regions and maintain the flow of commodities within a particular geographical region assigned to a particular user.

* * * * *